Nov. 9, 1954  S. P. JONES  2,693,820
PRESSURE REGULATOR
Filed March 22, 1950  3 Sheets-Sheet 1

Sam P. Jones
INVENTOR.

BY Ashley & Ashley
Attorneys

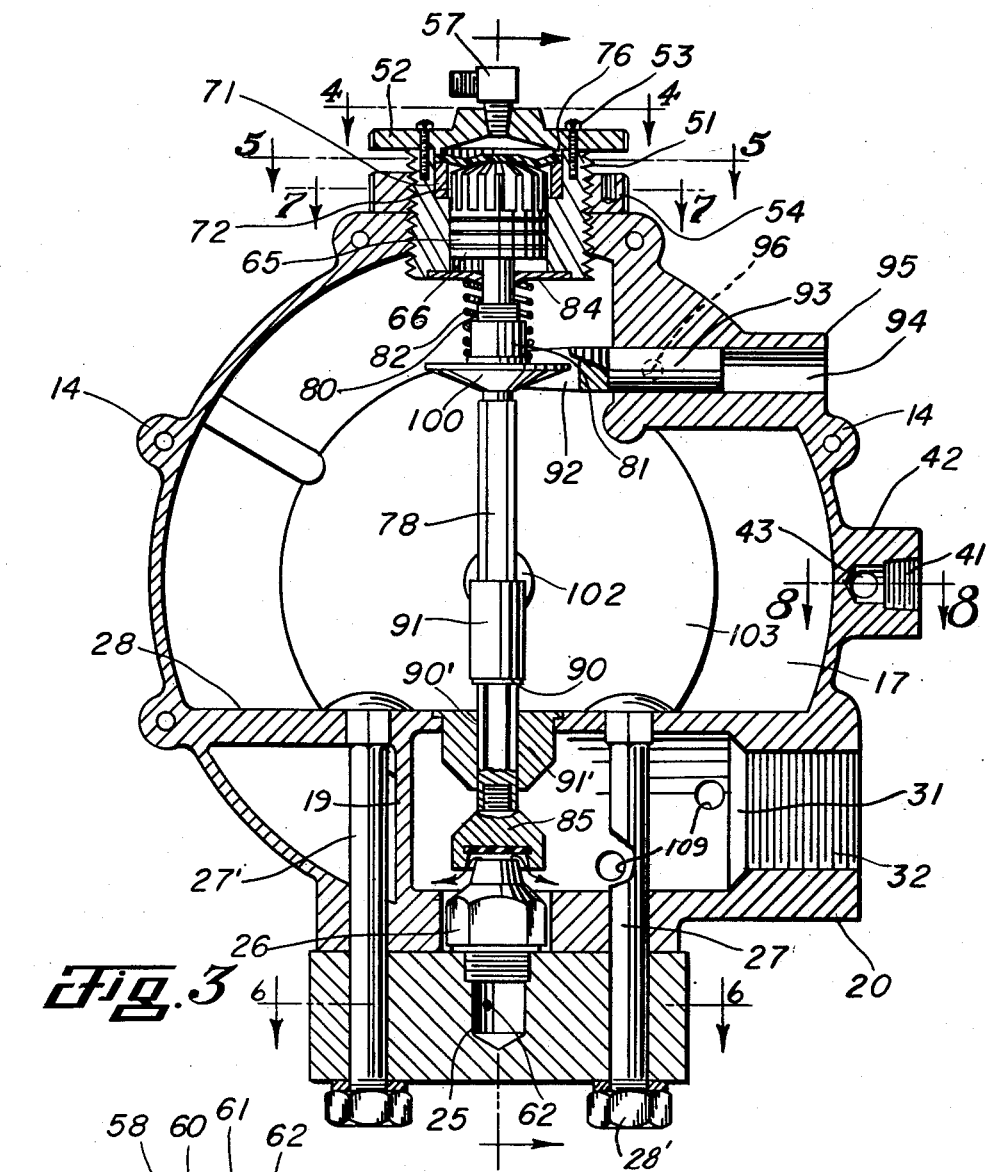

Nov. 9, 1954  S. P. JONES  2,693,820
PRESSURE REGULATOR
Filed March 22, 1950  3 Sheets-Sheet 3
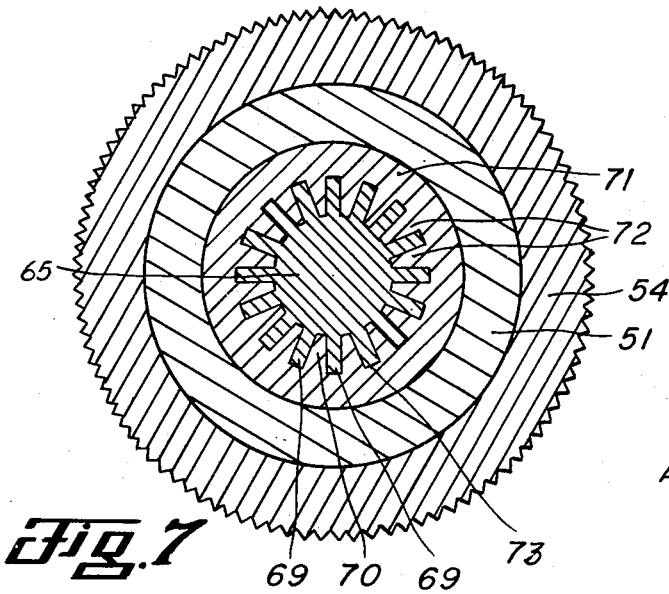
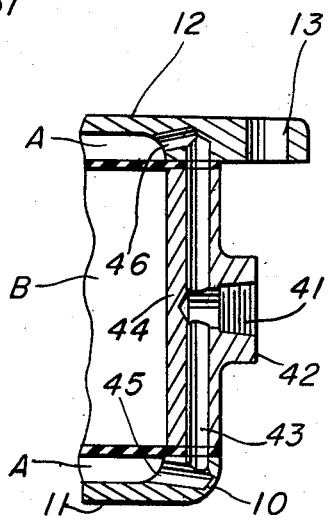
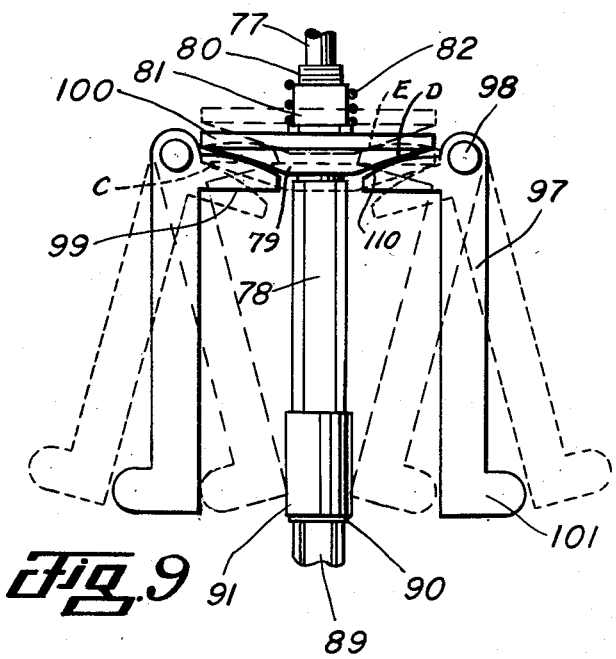
Sam P. Jones
INVENTOR.
BY Ahley & Ahley
Attorneys

United States Patent Office 2,693,820
Patented Nov. 9, 1954

2,693,820

PRESSURE REGULATOR

Sam P. Jones, Dallas, Tex.

Application March 22, 1950, Serial No. 151,128

18 Claims. (Cl. 137—494)

This invention relates to new and useful improvements in pressure regulators.

One object of the invention is to provide an improved regulator to which fluid may be supplied under a pressure well above atmospheric pressure, and which will meter and regulate said fluid to provide a supply of fluid at a constant sub-atmospheric pressure.

An important object of the invention is to provide an improved regulator having a completely balanced valve.

Another important object of the invention is to provide an improved regulator having an inlet valve with a valve stem and adjustable means for compensating for the pressure exerted upon said valve stem through the fluid under pressure acting through the inlet valve seat onto the inlet valve.

Yet another object of the invention is to provide an improved regulator having a novel valve which is subjected to increasing loads as it unseats and opens.

A particular object of the invention is to provide an improved regulator of the diaphragm-actuated type having a novel linkage between the diaphragms and the regulator inlet valve to modify the regulating action of the valve in accordance with the pressure downstream of the regulator.

A construction designed to carry out the invention will be hereinafter described together with the other features of the invention.

Figure 1:
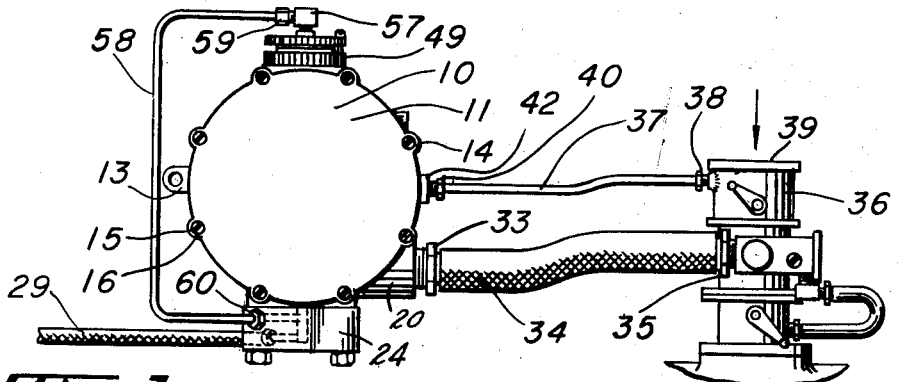
Figures 2, 4, 5:
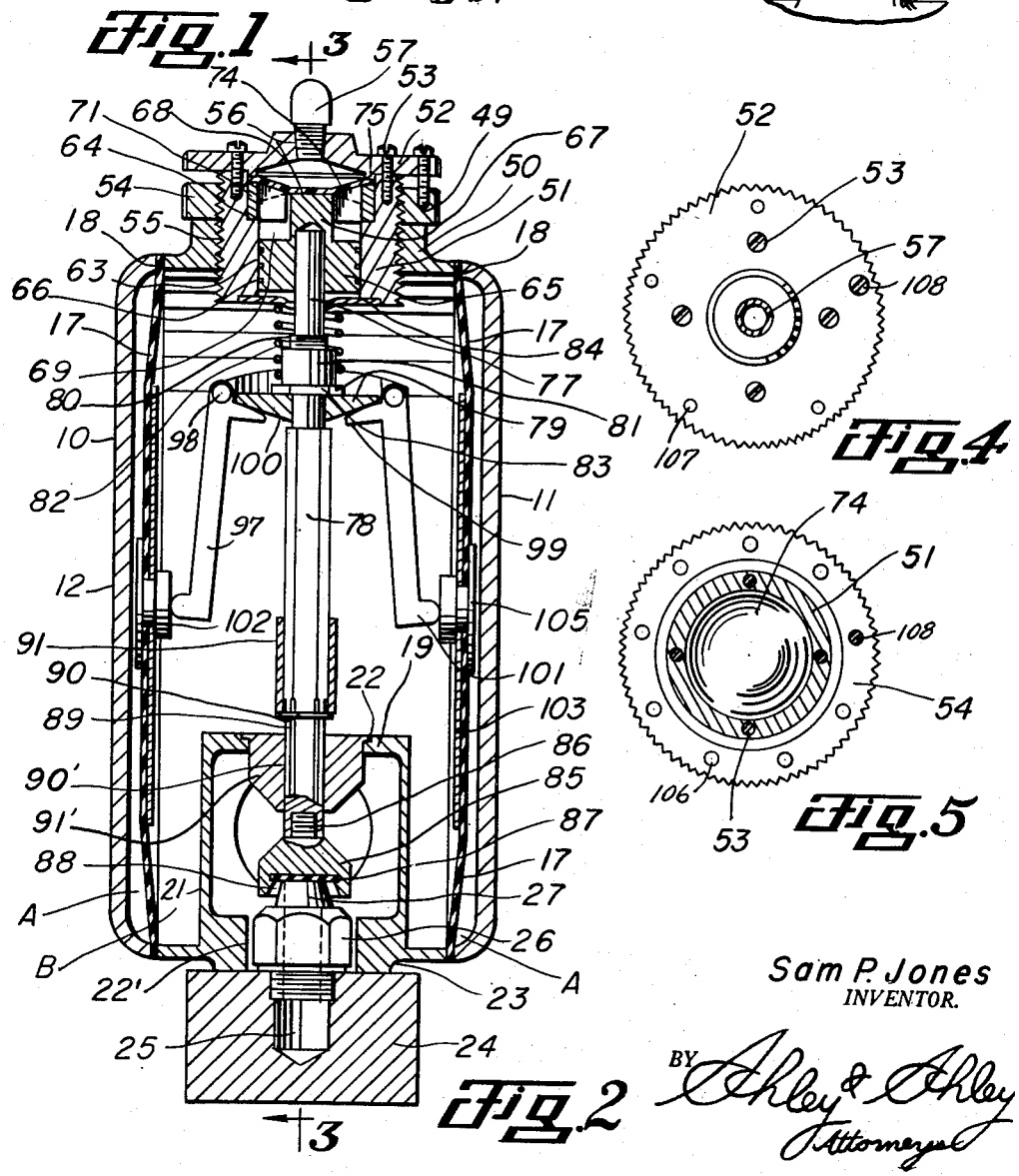

The invention will be more readily understood from a reading of the following specification and by reference to the accompanying drawings, wherein an example of the invention is shown, and wherein:

Fig. 1 is a side elevational view of a regulator constructed in accordance with this invention, showing the regulator connected to an engine carburetor, Fig. 2 is a vertical, cross-sectional view of the regulator, Fig. 3 is a vertical, transverse, sectional view taken upon the line 3—3 of Fig. 2.

Figs. 4, 5, 6, and 7 are horizontal, cross-sectional views taken upon the respective lines of Fig. 2, Fig. 7 being drawn to an enlarged scale.

Fig. 8 is an enlarged, fragmentary, horizontal, cross-sectional view taken upon the line 8—8 of Fig. 2, and Fig. 9 is an enlarged, fragmentary view in elevation of the diaphragm and inlet valve linkage structure, illustrating the operating action of said structure.

In the drawings, the numeral 10 designates a cylindrical housing body or casing which has a front cover plate 11 and a rear cover plate 12, said plates being generally circular and substantially duplicates, except that the rear plate has diametrically opposite lugs 13, by which it may be mounted on a suitable support. The casing has equally spaced exterior, transverse bosses 14 which abut at their ends lugs 15 on the margins of the plates 11 and 12. Screws 16 mounted in the lugs are screwed into the ends of the bosses 14. The margins of circular diaphragms 17 are clamped between the circular side edges of the casing and annular, marginal flanges 18 on the inner sides of the plates. In this manner chambers A are formed between the diaphragms 17 and the plates 11 and 12 and the interior of the casing 10 is closed off from the chambers A. This leaves a chamber B within the casing 10, which is sealed off by the diaphragms 17.

At the bottom of the casing, a horizontally extending transverse housing 19 is formed within the casing, integral therewith and has its outer end terminating in an annular boss 20, on the right hand (Figs. 1 and 5) outer side of said casing. The housing within the casing, has an upstanding, cylindrical box 21, which is provided with a flanged opening 22 in its top and a circular opening 22' in its bottom boss 23. The bottom boss extends through the annular bottom wall of the casing and has its underside flat to form a fluid-tight joint with the upper flat side of a transverse junction block 24. The block has a central counter-bored well 25 and a nipple 26 has its lower end screwed into the bore and occupying the opening 22'. The nipple has a frusto-conical nozzle 27 on its upper side. The block 24 is fastened on the bottom of the boss 23 by a pair of vertical bolts 27', one of which extends down through the bore of the housing 19, boss 23, and block 24, and the other of which extends down through an integral brace 28 within the casing at the side of the box 21, and thence through the boss 23 and block 24. Nuts 28', screwed on the lower ends of the bolts, hold the block sealed against the underside of the boss 23.

Fluid under pressure is supplied by a hose 29 to a nipple 29' screwed into a counter-bored passage 30 extending radially into the block to the well 25. The housing 19 has a bore 31 which extends from the box 21 to the screw-threaded bore 32 of the boss 20. A nipple 33 is screwed into the boss and secured to one end of a hose 34 which conducts fluid from the regulator under reduced pressure to the point of use. For instance, the opposite end of the hose 34 may be attached to a nipple 35 which is screwed into the side of a carburetor 36. A balance line pipe 37 may be used in this particular application of the invention, and has a nipple 38 at one end screwed into the throat 39 of the carburetor. At the other end of the pipe, a nipple 40, attached thereto, is screwed into the bore 41 of a boss 42 on the right hand side (Figs. 1 and 3) of the casing. The bore 41 (Fig. 8) centrally manifolds a transverse duct 43, formed in a boss 44 extending across the outer side of the casing and registering at its ends with angular passages 45 and 46 formed in the margins of the cover plates 11 and 12, respectively. The passage 45 discharges into the chamber A on the front side of the casing; while the passage 46 is at the base of the right hand (Figs. 1 and 8) lug 13 and discharges into the chamber A at the rear side of the regulator. The use of the balance pipe 37 is customary in the carburetor art, but is not essential. The chambers A may be vented directly to the atmosphere, if desired, or may be connected to other sources of pressure giving rise to a pressure differential across the diaphragms 17.

An adjusting unit, indicated generally by the numeral 49 is mounted in a central boss 50 at the upper end of the casing. The unit 49 includes a screw-threaded, cylindrical head 51 having a flanged, disk-like cap 52 secured thereto by machine screws 53. The head is externally screw-threaded to receive a locking ring 54, screwed thereon. The boss 50 has a central screw-threaded opening 55, through which the lower end of the head is screwed. It is pointed out that after the head has been screwed through the opening 55, to the desired point, the ring 54 is then screwed down tightly onto the boss 49 so as to remain stationary and hold the head against movement.

While the adjusting unit may vary to a considerable extent, I prefer to use the structure illustrated in the drawings. The cap 52 has a central screw-threaded opening 56 receiving a right angular nipple 57. A bypass tube 58 has a swivel nut 59 on its upper end engaged on the nipple 57. The lower end of the tube has a nipple 60 screwed into a radial counterbored passage 61 in the block 24 (Fig. 6). The passage 61 terminates in a reduced bore 62 extending to the well 25.

The head 51 has an axial bore 63 therethrough, counterbored at its upper end to form a shoulder 64. A plunger 65 has a sliding fit in the bore 63. The plunger is cylindrical and has a plurality of spaced, horizontal friction-reducing grooves 66, surrounding its lower cylindrical surface, while the upper end is formed with a central, cylindrical core 67 having a flat top 68. Blades or splines 69 extend radially from the core and have their outer vertical edges flush with the outer surface of the plunger and their upper edges inclined downwardly from the core. Between the splines are outwardly flaring sockets 70. A seat ring 71 is seated on the shoulder 64 and has radial, inwardly extending fins 72, each of which converges inwardly, whereby radial recesses 73 are formed therebetween. By this arrangement the splines 69 have a snug sliding fit in the recesses 73 and the sockets 70 snugly receive the fins 72.

By observing Figs. 2 and 5 it will be observed that the upper edges of the fins 72 are inclined inwardly and downwardly or opposite to the inclination of the splines. The fins terminate at the inner ends of the sockets at the annular surface of the core 67. A flexible diaphragm 74 has its circular edge held on the upper circular face 75 of the ring 71 by a depending, annular boss 76 on the underside of cap 52, said boss having a snug fit in the upper end of counterbore of the bore 63. The underside of the cap is dished within the boss 76 and the nipple 57 discharges fluid into said dished portion and as well as into the upper end of the bore 63 and onto the top of the diaphragm 74.

As will be pointed out hereinafter, the plunger 65 is adapted to move upwardly and downwardly within the bore 63, but under fixed conditions of flow and pressure is held relatively stationary with respect to the regular housing 10. On the other hand, the ring 71, which is held upon the shoulder 64 by the cap 52, is adapted to move upwardly and downwardly with the head 51 as the latter is screwed upwardly and downwardly within the screw-threaded bore 55.

Thus, the underside of the diaphragm rests upon the seat ring 71 in the dished surface thereof when said ring is sufficiently raised above the plunger 65. It is obvious that when the ring is lowered to an elevation where the entire top edges of the splines 69 of the plunger are exposed, a cross-sectional area equal to the exposed cross-sectional area of the plunger contacts the underside of the diaphragm and is subjected to the pressure being exerted on the latter. As the seat ring is raised with respect to the plunger, the splines 69 beginning at their outer ends, are received within the recesses 73, whereby the underside of the diaphragm begins to be supported on the upper edges of the fins 72 carried by said seat ring. As the raising of the seat ring is continued and the area of the diaphragm supported on the fins 72 is increased, the area acting on the plunger is proportionately decreased. The minimum point is finally reached where only the central area of the diaphragm, resting on the flat top 68 of the plunger, is active upon said plunger. In this manner, by vertical adjustment of the seat ring, larger or smaller areas of the diaphragm are caused to bear upon the plunger 65.

An axial stem 77 on the upper end of a plunger rod 78 has a snug sliding fit in the plunger 65, as is best shown in Fig. 2. A flat disk 79 rests loosely upon the upper end of the plunger and at the base of the stem. Above the disk the stem has screw-threads 80 and a collar 81 is screwed thereon. This collar telescopes the lower end of a coiled spring 82, which rests upon a wrench flange 83 around the bottom of said collar. The spring surrounds the stem 77 and engages the bottom of a disk 84 through which the stem slides and which is pressed into the lower end of the head 51.

A frusto-conical valve head 85 has an upstanding screw-threaded stem 86, screwed into the bottom of the plunger rod 78. This valve head has an elastic disk 87, formed of synthetic rubber or the like, embedded in its bottom and an outwardly flared sump 88 extends down from the disk. The upper end of nozzle 27 is of considerably less diameter than the diameter of the sump 88. The rod 78 is mutilated at a point adjacent its lower end, as is indicated at 89, and a stop ring 90 is fastened thereon. This ring supports a short sleeve 91, slidable on the rod 78. The portion of the piston rod 78, below the ring 90 is slidable in the cylindrical bore 90' of a flanged bushing 91' mounted in the top of the box 21 and received in the shouldered opening 22.

A horizontal yoke 92 has a central stem 93 extending laterally into a bore 94 formed in a boss 95 cast within the casing 10. This stem is fastened in the bore by a set screw 96. The yoke is of such radius and is at such an elevation as to loosely surround the adjacent half of the disk 79 and is of such thickness that the disk remains therein during its various vertical movements. On the outer ends of the yoke, the upper ends of vertically-depending, elongate arms 97 are pivoted upon headed pins 98. Just below its pivot, each arm has an inwardly-directed lateral finger 99 which are relatively short and the upper surface of which engages the transversely concave and upwardly inclined underside face 100 of the disk 79.

Each arm has an outwardly directed toe 101 at its lower end. The outer end of each toe is rounded and engages a button 102 on the inner side and at the center of circular plates 103 carried by the diaphragms 17. The button on each side of the casing 10, is on the inner end of a stud 104 passing snugly through the centers of plates 103 and the adjacent diaphragms 17. A large flat disk 105 on the outer end of each stud, snugly engages the outer, central face of the diaphragm. By this arrangement, pressure exerted upon the outer faces of the diaphragms forces them and the buttons 102 inwardly, whereby the arms 97 are swung inwardly and the fingers 99 are elevated. The fingers raise the disk 79 and plunger rod 78 against the tension of the spring 82.

The disk 79, being loose on the stem 77, allows some lost motion; however, when the flat top of the disk engages the bottom of the collar 81, continued inward pressure on the toes 101, continues the elevation of said disk, whereby the spring 82 is compressed and the plunger 65 is lifted. When the rod 78 is lifted, the valve 85 is also lifted from its seat on the nozzle 27. The sleeve 91 moves with the rod 78 and provides a limiting stop for the arms 97 in their inward swinging. Excess distortion or flexing of the diaphragms 17 is thus avoided.

In the operation of the regulator, fluid under pressure is applied through the hose 29 to the well 25 and the valve seat nipple 27. Such fluid may be natural gas, butane or low pressure gas, or any other fluid the flow of which is desired to be regulated. A particular and important application of the invention is in the regulating of the pressure of fuel gas supplied to the carburetors of internal combustion engines. It is to be kept in mind, however, that the invention is not limited to this application and that the same is used merely for the purposes of illustration and explanation. The gas supply may be under an appreciable pressure, for instance several pounds per square inch, and it is manifest that such pressure will be exerted upon the portion or area of the valve seat disk 87 exposed to the bore of the nipple 27. Ordinarily, the application of such pressure would tend to force the valve open, and it would be necessary for the spring 82 to be of considerable strength in order to hold the valve securely closed when the regulator was not operating. It naturally follows that the use of a heavy spring would reduce the sensitivity of the regulator, and would require the application of relatively large pressure differentials to the valve operating diaphragms in order to open the valve and overcome the force exerted by a heavy valve spring.

In the present invention, the pressure of the supply fluid is also communicated through the passage 61 and the conductor 58 to the upper side of the diaphragm 74. The pressure exerted upon the diaphragm 74 acts upon the upper end of the plunger 65, in accordance with the proportionate area of said plunger exposed to the diaphragm, and thus places a load upon the stem 78 acting downwardly in opposition to the load acting upwardly thereon from the valve disk 87. It immediately appears that the valve stem may be placed in a balanced load condition by this apparatus whereby the spring 82 is relieved of the burden of holding the valve closed under certain conditions, and may be made of much less strength so as to be more sensitive to pressure differentials. The spring thus becomes purely a regulator spring and manifold advantages are achieved.

It is necessary that substantially equal areas be exposed to the pressure of the supply fluid at the upper and lower ends of the stem 78 if the same is to be maintained in balance. Ordinary manufacturing procedures and tolerances will not assure such equality of exposed area, and provision must be made for wear of the valve seat and the other elements. The adjusting mechanism 49 is therefore provided for adjusting and selecting the effective area for the diaphragm 74 in order to balance the valve stem in a proper fashion. As hereinbefore pointed out, as the head 51 is screwed upwardly and downwardly within the screw-threaded bore 55, the seat ring 71 will move upwardly and downwardly with respect to the plunger 65. This is true, because when the valve is closed, the stem 78 remains stationary and the plunger 65 also remains stationary. As the head is moved vertically, however, increasing or decreasing amounts or areas of the splines 69 of the plunger are exposed to the diaphragm 74, and the effective area of the diaphragm which may act upon the plunger, and therefore upon the valve stem 78, is increased and decreased. Obviously, by proper positioning of the head 51, the valve stem 78 may be placed in complete balance.

For maintaining the adjusting mechanism 51 in its properly adjusted position and condition, the locking ring 54 is provided with a plurality of cylindrical openings or recesses 106 equally spaced about its marginal portion. In the specific embodiment illustrated in the drawings, nine of the openings 106 have been provided. The flanged cap 52 is provided with a smaller number of screw-threaded openings 107, similarly arranged in a circle about its marginal portion in vertical alinement with the circle passing through the centers of the openings 106. When the head 51 has been revolved or screwed by the cap 52 into its proper position, and the locking nut 54 has been screwed down tightly onto the upper surface of the boss 50, a suitable screw-threaded bolt 108 may be passed through one of the openings 107 into one of the openings 106 to lock the adjusting structure in the desired position. Since the number of the openings 107 is less than the number of the openings 106, a multitude of annular positions of the cap with respect to the locking ring are provided. In the particular embodiment illustrated in the drawings, five of the screw-threaded openings 107 are provided, and it is obvious that in almost any rotational relationship between the cap and the locking ring, one of the openings 107 will be substantially alined with one of the openings 106.

When the valve is not operating, the pressure upon both sides of the diaphragms 17 will be equalized, and because the stem 78 is in a balanced load condition, the spring 82 will exert sufficient force to hold the disk 87 snugly against the nipple 27, and there will be no flow of gas. As a reduced pressure is exerted through the conductor 34, however, such reduced pressure will be communicated to the housing 19 and from the latter through openings 109 to the interior of the casing 10. There may also be some pressure communication around the lower portion of the valve stem 78 which has a loose fit within the bore of the flanged bushing 91'. The reduced pressure within the chamber B allows the diaphragms 17 to be urged inwardly by the pressure present in the chambers A so as to swing the arms 97 inwardly and raise the disk 79 and the valve stem 78. At this point, it is to be noted that both the diaphragms 17 simultaneously act upon the valve stem, and that said diaphragms are of considerable area. By this means, a very large diaphragm area is provided and the regulator is made responsive to very small pressure differentials. Here again, the sensitivity of the regulator is greatly increased.

The inward moving of the diaphragms 77 causes the lifting of the valve disk 87 from the seating nipple 25 and gas to flow into the interior of the housing 19 and into the chamber B. The regulator now commences to function in the manner common to all regulators, the spring 82 and the diaphragms 77 cooperating to maintain a constant predetermined reduced pressure within the chamber B, within the housing 19 and in the conductor 34 leading to the point of use of the fluid stream which is being regulated. It is to be noted, however, that the balancing of the valve and valve stem structure eliminates the usual tendency of regulators to open or to open wider as the differential between the upstream and downstream pressures increases. For this reason, the regulator of the present invention is enabled to supply gas at atmospheric pressure or at sub-atmospheric pressures, and the pressure of the gas being supplied through the conductor 29 will have no effect upon the action of the regulator or the pressure downstream thereof.

It will be seen that as the regulator valve opens and the valve stem 78 moves upwardly within the casing 10, the plunger 65 is moved upwardly with respect to the seat ring 71, and an increasing area of the diaphragm 74 is caused to bear upon the upper portion of the plunger. Without compensation, such action will throw the valve stem out of balance and would cause the regulator to function erratically and improperly. This undesirable effect is negatived and compensated for by means of the unique structure of the valve head 85 and the sump 88. When the valve disk 87 is seated upon the nipple 27, only an area equal to the area of the bore of the nipple 27 is exposed to the pressure of the supply fluid, and compensation must be made only for the force exerted upon this small area. As the valve disk moves upwardly from the seat, however, an increasing area of the disk 87 is exposed to the inlet pressure. The entire area of the disk will not be instantaneously exposed as soon as the valve opens because the conditions present have changed from a static nature to one of a kinetic or flowing fluid condition. By proper design and selection of the diameter of the sump 88 and the inclination of its side walls, a valve structure may be obtained which exerts an upward force upon the stem 78 substantially equal to the downward force exerted by the diaphragm 74 in all positions of the valve. The design of the head 85 and the sump 88 will depend in part upon the design of the splined plunger and seat ring structure within the adjusting mechanism 51, and also in part upon the degree of inclination of the upper edges of the splines 69 and the splines 72. No precise instructions may be given for the proportioning and design of the sump 88 since it will depend to some extent upon the relative sizes and dimensions of the remainder of the regulator structure and the operating conditions thereof.

The construction and arrangement of the arms 97 and the disk 79 are of particular importance when the regulator is used in conjunction with a carburetor such as the carburetor 36. As is customary in such arrangements, the carburetor is provided with a Venturi (not shown) in its air inlet stack, and the hose or conductor 34 communicates with the throat (not shown) of such Venturi. With this arrangement, a reduced pressure is exerted within the conductor 34, the magnitude of reduction of the pressure being in accordance with the velocity of flow through the Venturi in accordance with well known physical principles. It is to be noted, however, that such reduction in pressure is not in direct proportion to the velocity or rate of flow of air through the Venturi, and that the supply of fuel gas through the conductor 34 therefore cannot be made directly proportional to the change in pressure in said conductor 34. When air is flowing through the carburetor stack at low velocities, the reduction in pressure within the conductor 34, and therefore within the chamber B, would be below average or too low to open the regulator valve a sufficient amount. At intermediate rates of flow, the pressure reduction would be adequate and sufficient for this purpose, but at high rates of flow when the carburetor is operating at or near its maximum capacity, the reduction in pressure would be too great, and there would be a tendency for the regulator to supply too much gas to the carburetor, resulting in an overly-rich fuel mixture and the needless waste of fuel. The present invention overcomes this difficulty by varying the effective force applied to the valve stem 78 by the diaphragms as the latter flex through their normal movement, and in making provision for the application of a greater degree of force when the diaphragms are only slightly flexed, and for decreasing percentages of force as the diaphragms move toward the center of the regulator structure. This feature is illustrated in Fig. 9 of the drawings and involves the pivoting and arrangement of the arms 97 and the fingers 99 with respect to the bevelled and transversely concave underside face 100 of the disk 79 so that the fingers bear upon the outer edge or marginal portion of the disk 79 when the regulator valve is closed or barely open. Of course, the diaphragms 17 are responsive to the pressure differential between the chambers A and B in order to move inwardly toward the valve stem 78 and to swing the arms 97 toward said stem. The diaphragms bear constantly against the toes 101 of the arms 97 and the lengths of the lever arms respresented by the spacing between the pivot pins 98 and the toes 101 remain constant. The effective lengths of the lever arms provided by the fingers 99, however, change as the arms 97 move toward the valve stem 78, this action commencing when the valve is barely open as illustrated in dotted lines in Fig. 9. In this position, the fingers 97 are bearing against the underside of the disk 79 at the point C, and the effective length of the upper lever arm is the dimension between the point C and the center of the pivot pin 98. An increased mechanical advantage is provided at this point, and a smaller pressure differential across the diaphragms 17 is required to lift the valve stem 78 a given amount.

When the diaphragms reach an intermediate point and the arms 97 have been swung to the position shown in solid lines in Fig. 9, the fingers 99 are bearing against the disk 79 at the point D, and it is to be noted that the effective lengths of the upper lever arms have been increased. At this point, average or intermediate pressure differentials are sufficient to raise the valve stem 78 the necessary or desired amount and to hold the stem in such position against the compressive force of the spring 82.

At high pressure differentials, the point of contact of the arm 97 of the fingers 99 continues to change, and in this position, shown in dash lines in Fig. 9, the extreme inner ends of the fingers 99 bear against the underside of the disk 79 at the point marked E. Hence, the effective lengths of the upper lever arms, represented by the fingers 99, are still further increased and a greater pressure differential is required to raise the valve stem 78 or maintain it in its position. Provision is thus made for progressively reducing the valve opening effect of a given increment of pressure differential across the diaphragms 17, and for supplying gas through the regulator in proper amounts regardless of the non-linear relationship between the rate of air flow through the carburetor 36 and the pressure reduction exerted thereby in the conductor 34.

It is not necessary or desirable that the changing of the lever lengths or mechanical advantage provided by the arms 97 and the fingers 99 be decreased in steps of appreciable magnitude, and for this reason the upper surfaces of the arms 99 are curved as shown at 110 in Fig. 9. This curved upper surface causes a gradual and continual increase in the length of the upper lever arm as the lower lever arms 97 move toward the stem 78 and thus provides a gradual and continuous increase in the pressure differential required to open the regulator valve a predetermined amount. Obviously, by proper selection of the curvature of the upper surfaces of the fingers 99, this compensating feature may be matched substantially exactly to the actual performance of a device, such as the carburetor 36, to which the regulator is connected and within which the operating pressure differentials are created. Further, compensation may be made for failure of the spring 82 to function as a perfect spring and to exhibit a straight line load-deflection curve.

The curvature of the engaging faces of the fingers 99 and the underside 100 of the disk 79 provides a true rocking action between these elements rather than an action which is partially a rocking one and partially a sliding one. It is desirable to eliminate sliding movement and friction between the fingers 99 and the disk 79 insofar as possible in order to reduce wear of the parts and to maintain the sensitivity of the regulator. Only very small forces are available in the form of pressure differentials to operate the regulator or to vary the opening of the regulator valve, and it is important that such forces be employed toward valve opening and not toward the overcoming of frictional loads. With a reduction of friction, the regulator is made more responsive to small changes in pressure.

It has been found that several structural features enhance the desired rocking motion and reduce if not eliminate any sliding movements between the fingers and the disk. First, the radius of curvature of the concave underside 100 of the disk should be approximately twice that of the convex upper faces 110 of the fingers. Second, the faces 110 should approach tangentially an imaginary line passing through the centers of the pivot pins 98 perpendicularly to the longitudinal axes of the arms 97. Last, of course, the curvature of the faces 110 must be such as to maintain the compensations outlined hereinabove and which arise through the operating characteristics of the device to which the regulator is connected.

In the event the regulator becomes unbalanced while in use, it may very readily be re-balanced without disconnection from the equipment it is serving. The equalizer pipe 58 is disconnected, and the entire adjusting mechanism 51 is screwed out of the bore 55. The stem 77 may then be grasped and the entire valve and valve stem structure lifted from the regulator housing. The spring 82 is removed and the structure is reassembled with the bolt 108 removed and the locking ring 54 screwed upwardly upon the head 51. The equalizing pipe 58 is re-connected and the entire adjusting unit 51 is screwed upwardly and downwardly within the bore 55 until the valve disk 87 just barely seats under the application of pressure from conductor 29. The seating of the valve can be determined by the cessation of the sound of escaping gas under pressure. The procedure is now reversed and the spring is reintroduced into the assembled structure. Of course, when the balance point is determined, the bolt 108 is introduced into the proper one of the openings 106 to lock the adjusting unit in the balanced position. The reintroduction of the spring places a positive closing bias upon the valve operating rod 78 and maintains the valve in a positively closed condition. No matter how much the pressure in the conductor 29 may increase or decrease, the valve will not open because the pressure is being applied equally to both ends of the stem or rod 78 and the entire force of the spring is utilized in holding the valve closed and is not required to withstand any pressure exerted upon the underside of the disk 87.

It is manifest that when the valve rod assembly is removed in the manner described, the valve disk 87 is easily inspected and replaced if necessary. Further, the position of the sleeve 81 may be checked and adjusted if necessary to compensate for wear within the regulator, such as wear upon the pivot pins 98, or wear of the valve disk 87.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A pressure regulator including, a housing, a pressure fluid inlet into the housing, a pressure fluid outlet from the housing, a valve controlling the flow of fluid from the inlet to the outlet, said valve including a valve seat and a valve member adapted to engage the valve seat and having a face exposed to the pressure within the pressure fluid inlet, means for operating the valve, a valve stem connected to the valve member, pressure-responsive means on the valve stem having a face directed opposite to the face on the valve member, means for varying continuously in infinitely small increments the area of the pressure-responsive means face as the valve member moves to and from the seat, and a conductor communicating between the fluid inlet and the latter face.

2. A pressure regulator including, a housing, a pressure fluid inlet into the housing, a pressure fluid outlet from the housing, a valve controlling the flow of fluid from the inlet to the outlet, said valve including a valve seat and a valve member adapted to engage the valve seat and having a face exposed to the pressure within the pressure fluid inlet, means for operating the valve, a valve stem connected to the valve member, a plunger carried by the valve stem, a ring carried by the housing receiving the plunger, a diaphragm having one side bearing upon the ring and the plunger in a direction opposite to the valve member face, means for communicating the pressure within the regulator inlet to the opposite side of said diaphragm, and means for adjusting the axial position of the ring with respect to the plunger so as to vary the area of the diaphragm effective to apply force to the plunger.

3. A pressure regulator as set forth in claim 2, wherein the portion of the plunger receiving the diaphragm is beveled.

4. A pressure regulator as set forth in claim 3, wherein the portion of the ring receiving the diaphragm is dished.

5. A pressure regulator as set forth in claim 4, wherein the plunger and ring are splined and mesh with one another.

6. A pressure regulator including, a housing, a pressure fluid inlet into the housing, a pressure fluid outlet from the housing, a valve controlling the flow of fluid from the inlet to the outlet, said valve including a valve seat and a valve member adapted to engage the valve seat and having a face exposed to the pressure within the pressure fluid inlet, means for operating the valve, a valve stem connected to the valve member, a splined plunger carried by the valve stem, a splined ring carried by the housing meshing with the splined plunger, a diaphragm having one side bearing upon the splined ring and the splined plunger in a direction opposite to the valve member face, and means for communicating the pressure within the regulator inlet to the opposite side of said diaphragm.

7. A pressure regulator including, a housing, a pressure fluid inlet into the housing, a valve seat nipple connected to the inlet, a pressure fluid outlet from the housing, a valve stem, a valve closure carried by the stem having a face adapted to seat on the valve seat nipple, a flange on the closure around the valve closure face spaced from the valve seat nipple, means for operating the valve, pressure-responsive means on the valve stem having a face directed opposite to the face on the valve closure, said latter means being exposed to the pressure within the pressure fluid inlet, and means for varying the area of the pressure responsive means face as the valve closure moves to and from the valve seat nipple.

8. A pressure regulator including, a housing, a pressure fluid inlet into the housing, a valve seat nipple connected to the inlet, a pressure fluid outlet from the housing, a valve stem, a valve closure carried by the stem having a face adapted to seat on the valve seat nipple, a flange on the closure around the valve closure face spaced from the valve seat nipple, means for operating the valve, a plunger carried by the valve stem having one face beveled, a ring carried by the housing telescoped by the plunger, a diaphragm having one side bearing upon the plunger and ring in a direction opposite to the valve closure face, means for communicating the pressure within the regulator inlet to the opposite side of said diaphragm, and means for varying the area of the diaphragm as the valve closure moves to and from the valve seat nipple.

9. A pressure regulator as set forth in claim 8, and means for adjusting the ring axially of the plunger to vary the area of the diaphragm effective to apply force to the plunger.

10. A pressure regulator as set forth in claim 9, and means for locking the ring in an adjusted position.

11. A pressure regulator including, a housing, a pressure fluid inlet into the housing, a pressure fluid outlet from the housing, a balanced valve between the inlet and the outlet having a valve stem, an actuating disk on the valve stem having a lever-receiving face, a pair of levers pivotally mounted in the housing, each lever having a pair of lever arms, a pair of diaphragms engaging one arm of each lever, the opposite arm of each lever having a convex face engaging the lever-receiving face of the actuating disk.

12. A pressure regulator as set forth in claim 11, wherein the actuating disk is adjustable axially of the valve stem.

13. A pressure regulator as set forth in claim 11, and means on the stem limiting the pivoting of the levers.

14. A pressure regulator as set forth in claim 11, wherein the lever-receiving face of the actuating disk is transversely concave.

15. In a pressure regulator having a valve adapted to reduce the pressure of a fluid flowing between the inlet to the regulator and the outlet therefrom, said valve having a face exposed to the regulator inlet, pressure responsive means also exposed to the pressure within the regulator inlet, and a thrust connection between the pressure responsive means and the valve, said connection bearing upon the valve in a direction substantially opposite to the direction of thrust of the valve face, and including, a valve stem connected to the valve member, a plunger connected to the valve stem, a ring carried by the regulator and being telescoped by the plunger, the pressure responsive means being operatively engaged by the plunger and the ring whereby movement of said pressure responsive means causes movement of the plunger, and means for adjusting the ring axially of the plunger so as to vary the area of the pressure responsive means effective to apply force to the thrust connection.

16. A pressure regulator including, a housing, a pressure fluid inlet into the housing, a pressure fluid outlet from the housing, a valve controlling the flow of fluid from the inlet to the outlet, said valve including a valve seat and a valve member adapted to engage the valve seat and having a face exposed to the pressure within the pressure fluid inlet, means for operating the valve, a valve stem connected to the valve member, a plunger connected to the valve stem, a ring carried by the housing and telescoped by the plunger, a diaphragm having one side bearing upon the ring and the plunger in a direction opposite to thrusts exerted upon the plunger by the valve member face, and means for communicating the pressure within the regulator inlet to the opposite side of said diaphragm, and means for adjusting the ring axially of the plunger so as to vary the area of the diaphragm effective to apply force to the plunger.

17. A pressure regulator as set forth in claim 16 wherein the portion of the plunger receiving the diaphragm is bevelled.

18. A pressure regulator as set forth in claim 16 wherein the plunger and ring are splined and mesh with one another.

References Cited in the file of this patent

UNITED STATES PATENTS

| Number | Name | Date |
|---|---|---|
| 331,544 | Reinecke | Dec. 1, 1885 |
| 498,996 | Unger | June 6, 1893 |
| 571,346 | Dickerson | Nov. 17, 1896 |
| 1,132,424 | Arcus | Mar. 16, 1915 |
| 1,356,853 | Clark | Oct. 16, 1920 |
| 1,874,293 | Hook | Aug. 30, 1932 |
| 1,944,424 | Gleeson | Jan. 23, 1934 |
| 2,015,977 | Thrall | Oct. 1, 1935 |
| 2,070,068 | Rice | Feb. 9, 1937 |
| 2,345,824 | MacBeth | Apr. 4, 1944 |
| 2,433,221 | Huber | Dec. 23, 1947 |
| 2,439,242 | Curtis | Apr. 6, 1948 |
| 2,487,089 | Anthes | Nov. 8, 1949 |
| 2,511,342 | Jordan | June 13, 1950 |
| 2,587,375 | Paulsen | Feb. 26, 1952 |